April 17, 1928.

B. E. MIGLIN

ROASTER

Filed May 9, 1927

B.E. Miglin Inventor

By C.A.Snow&Co.

Attorneys

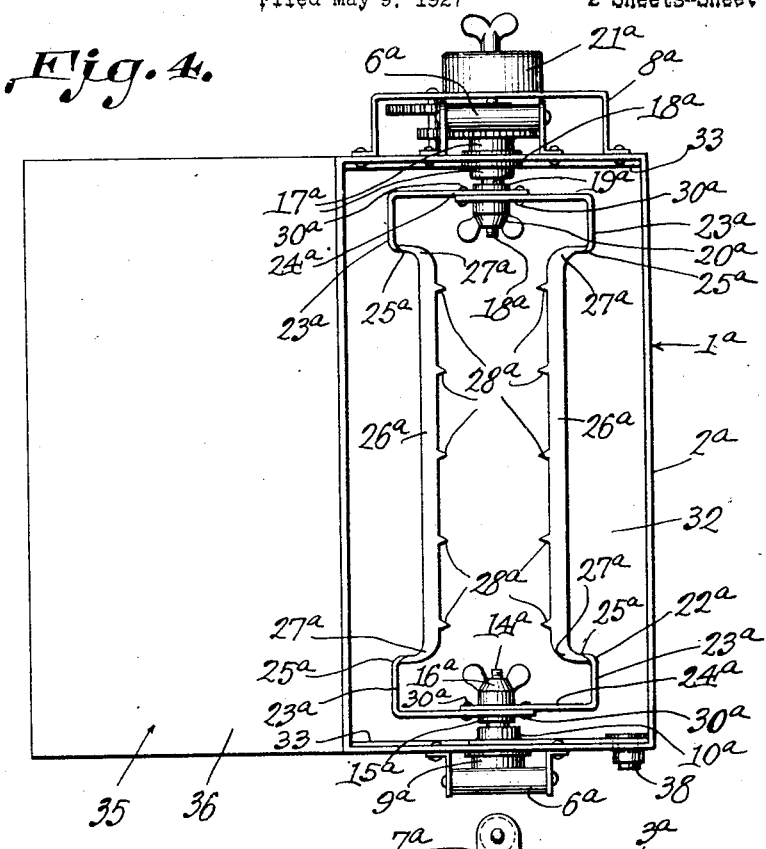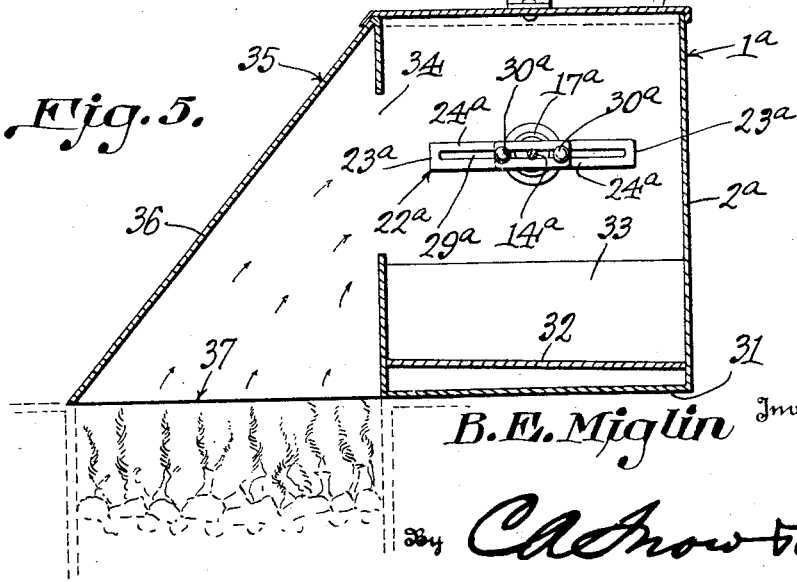

Patented Apr. 17, 1928.

1,666,394

UNITED STATES PATENT OFFICE.

BEN E. MIGLIN, OF ARCHBALD, PENNSYLVANIA.

ROASTER.

Application filed May 9, 1927. Serial No. 190,113.

This invention aims to provide a device adapted to be placed on a stove, for roasting meat, the meat being turned automatically during the roasting operation, and the invention aims to improve the form of the spit which carries the meat, to provide novel means for mounting the spit, and to improve the construction of the casing wherein the spit turns.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 4 is a top plan showing a modified form of the invention, the lid being removed;

Figure 5 is a transverse section of the structure shown in Figure 4.

Figure 1:
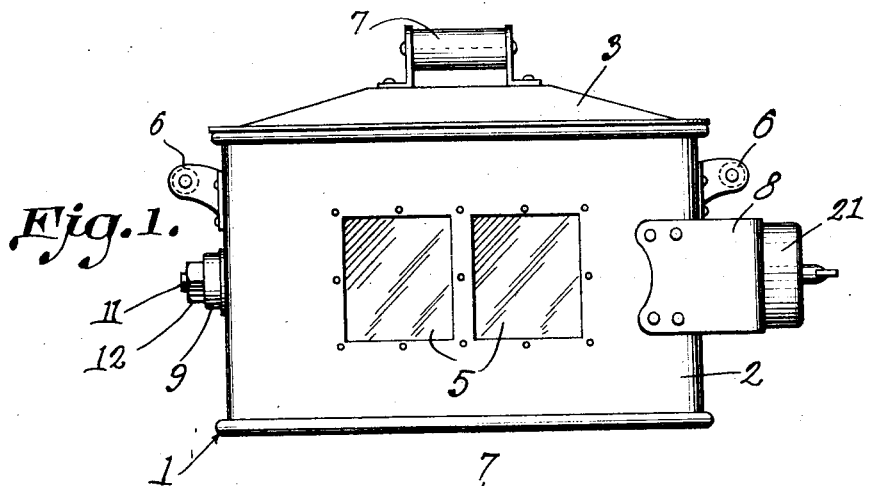
Figure 1 shows in side elevation, a device constructed in accordance with the invention.
Figure 2:
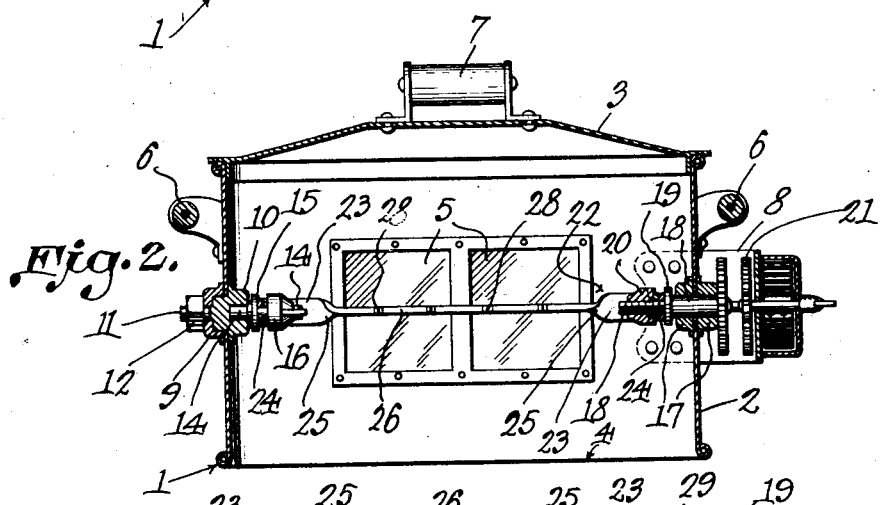
Figure 2 is a vertical longitudinal section wherein parts remain in elevation.
Figure 3:
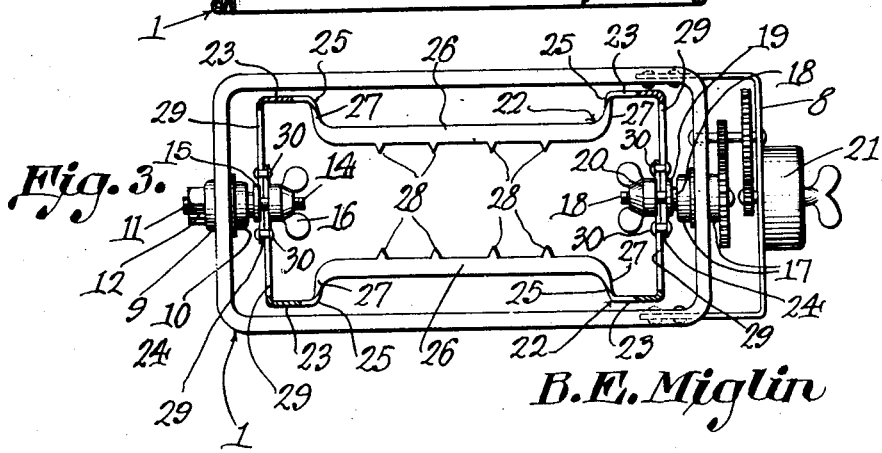
Figure 3, is a plan, sundry parts being omitted, and portions being in section.

Referring especially to Figures 1, 2 and 3, the device is shown as comprising a box-like casing 1, including a body 2 and a lid 3, the body 2 being open at its lower end, as shown at 4. The body 2 may be supplied with any desired number of inspection panes 5, so that the operator can ascertain at a glance, how the roasting operation is progressing. The body 2 is supplied with handles 6, and there is a handle 7 on the lid 3. A U-shaped bracket 8 is mounted on one end of the body 2. On the opposite end of the body 2 there is a socket 9 in which fits an internal bearing 10 having a stem 11, extended outwardly through the socket 9, a nut 12 being threaded on the stem 11, to hold the bearing 10 in the socket 9. A journal pin 14 is rotatable in the bearing 10 and is provided with an abutment flange 15. A wing nut 16 is mounted on the inner end of the journal pin 14. That end of the body 2 which is remote from the bearing 10 is supplied with external and internal bearings 17 wherein a shaft 18 is journaled for rotation, the shaft having an abutment flange 19, and there being a wing nut 20 threaded on the shaft 18. The outer end of the shaft 18 is operatively connected with a spring motor which is mounted on the bracket 8. No detailed description of the spring motor 21 is given, because it may be of any desired form.

The device includes an expansible spit made up of U-shaped members 22 comprising side bars 23 having overlapped ends 24, the side bars 23 being twisted as at 25, so that the intermediate portions 26 of the side bars have their greatest transverse dimensions located in the same plane with the axis of rotation of the spit. This construction strengthens the spit and enables it to carry the meat without bending it. The intermediate portions 26 of the side bars 23 of the spit are inset, as shown at 27, and are provided on their inner edges with inwardly projecting prongs 28. There are elongated slots 29 in the overlapped ends 24 of the members 22 of the spit. Connecting elements 30, such as rivets, are slidably mounted in the slots 29 and serve to hold the end portions 24 of the spit in the same plane. The journal pin 14 passes through the slots 29 at one end of the spit, and the overlapped ends 24 are bound between the wing nut 16 and the abutment flange 15. At the other end of the spit, the shaft 18 passes through the slots 29, and the corresponding overlapped ends are bound between the wing nut 20 and the abutment flange 19. The construction is such that the spit may be increased or decreased in width, at will, by loosening the nuts 16 and 20, and when the wing nuts are tightened up, they will hold the spit at any width to which it may have been adjusted. The wing nut 20 connects the spit to the shaft 18, and when the shaft is rotated by means of the motor 21, the spit will be rotated also, all portions of the periphery of the meat being presented to the fire. The meat, of course, is carried on the prongs 28, and the U-shaped members 22 of the spit can be adjusted toward and away from each other to embed the prongs 28 in the meat. Ordinarily, the body 2 is placed directly over the open holes of a stove, and the heat can ascend directly into the body 2: although, if desired, the holes in the stove can be covered to any desired extent, so as to regulate the amount of heat that rises into the casing 1. The process of the roasting operation may be noted at any time, since the operator can peer through the inspection panes 5, and the lid 3 can be removed at any time to give access to the meat.

In Figures 4 and 5 of the drawings, parts hereinbefore described have been designated by numerals previously used, with the suffix "a". In this form of the invention, the body $2^a$ of the casing $1^a$ has a base plate 31, above which is disposed an inclined bottom 32 forming part of a pan the ends of which are shown at 33. The pan above defined is adapted to receive the juices from the meat, and the juices can be drawn off at any time, and the pan washed out, through an opening that is controlled by a removable closure 38, the opening being located at the lowermost portion of the inclined bottom 32 of the pan.

In the form shown in Figures 4 and 5, the body $2^a$ has an opening 34 in its side, the opening communicating with a hood 35 which forms part of the body, the hood being open at its bottom, as shown at 37, and being provided with an inclined wall 36. In this form of the invention, the casing $1^a$ is placed a little to one side of the holes in the cook stove. The heat from the cook stove enters the open bottom 37 of the hood 35, and by the inclined wall 36 is directed through the opening 34 into the body $2^a$.

What is claimed is:—

In a device of the class described, a casing, a shaft supported for rotation in the casing, a spit comprising side members, and overlapped end members having slots, the shaft passing through the slots, a connecting element slidable in the slots on one side of the shaft, and a clamping device binding the overlapped end members on the shaft.

In testimony that I claim the foregoing as my own, I have hereto affixed my signature.

BEN E. MIGLIN.